(12) United States Patent
Mayne, Jr.

(10) Patent No.: US 7,748,762 B2
(45) Date of Patent: Jul. 6, 2010

(54) VEHICLE CONSOLE ASSEMBLY

(75) Inventor: Rudy M. Mayne, Jr., Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 11/857,918

(22) Filed: Sep. 19, 2007

(65) Prior Publication Data

US 2009/0072565 A1    Mar. 19, 2009

(51) Int. Cl.
*B60R 7/04* (2006.01)

(52) U.S. Cl. .................... 296/24.34; 224/275

(58) Field of Classification Search ............. 220/520, 220/521; 224/275, 282, 539, 926; 296/24.34, 296/37.14
See application file for complete search history.

(56) References Cited

U.S. PATENT DOCUMENTS

| | | | | |
|---|---|---|---|---|
| 300,441 | A * | 6/1884 | Borst | 220/520 |
| 2,539,302 | A * | 1/1951 | Fye | 220/520 |
| 3,061,394 | A * | 10/1962 | Whetstone | 312/140.3 |
| 3,948,579 | A * | 4/1976 | Schirmer | 312/111 |
| 4,809,897 | A * | 3/1989 | Wright, Jr. | 224/282 |
| 4,893,850 | A * | 1/1990 | Mizusawa | 292/128 |
| 4,998,770 | A * | 3/1991 | Shimizu et al. | 296/37.8 |
| 5,067,625 | A * | 11/1991 | Numata | 220/827 |
| 5,076,641 | A * | 12/1991 | Lindberg | 297/188.19 |
| 5,144,720 | A * | 9/1992 | Aihara et al. | 16/232 |
| 5,173,992 | A * | 12/1992 | Aihara et al. | 16/232 |
| 5,195,272 | A * | 3/1993 | Yamada | 49/193 |
| 5,210,906 | A * | 5/1993 | Aihara et al. | 16/232 |
| 5,212,849 | A * | 5/1993 | Aihara | 16/232 |
| 5,337,911 | A * | 8/1994 | Holub | 220/254.3 |
| 5,397,160 | A * | 3/1995 | Landry | 296/37.8 |
| 5,628,438 | A * | 5/1997 | Legrow | 224/275 |
| 5,647,652 | A * | 7/1997 | Zalewski et al. | 312/324 |
| 5,836,496 | A * | 11/1998 | Levin et al. | 224/553 |
| 5,863,089 | A * | 1/1999 | Ignarra et al. | 296/37.8 |
| 6,000,572 | A * | 12/1999 | Kako et al. | 220/522 |
| 6,003,716 | A * | 12/1999 | Allison et al. | 220/326 |
| 6,129,400 | A * | 10/2000 | Jakubiec et al. | 296/37.14 |
| 6,170,723 | B1 * | 1/2001 | Howell | 224/404 |
| 6,250,729 | B1 * | 6/2001 | Allison et al. | 312/324 |
| 6,321,925 | B1 * | 11/2001 | Crouse et al. | 220/4.27 |

(Continued)

FOREIGN PATENT DOCUMENTS

JP    57164821 A  * 10/1982

(Continued)

*Primary Examiner*—Glenn Dayoan
*Assistant Examiner*—Paul A Chenevert
(74) *Attorney, Agent, or Firm*—Mark E. Duell; Rankin, Hill & Clark LLP

(57) ABSTRACT

A console and armrest assembly for a vehicle includes a console base defining a first storage area and a first storage opening for providing access to the first storage area. A first intermediate member is configured to selectively close the first storage area opening. The first intermediate member defines a second storage area in a second storage area opening for providing access to the second storage area. A second intermediate member is configured to selectively close the second storage area opening. The second intermediate member defines a third storage area and a third storage area opening for providing access to the third storage area. An armrest cover is configured to selectively close the third storage area opening.

20 Claims, 6 Drawing Sheets

U.S. PATENT DOCUMENTS

| | | | |
|---|---|---|---|
| 6,508,508 B1 | 1/2003 | Bargiel | |
| 6,616,205 B2 | 9/2003 | Bruhnke et al. | |
| 6,644,526 B2 * | 11/2003 | Pegorier | 224/539 |
| 6,663,155 B1 * | 12/2003 | Malone et al. | 296/37.8 |
| 6,719,343 B2 * | 4/2004 | Emerling et al. | 296/24.34 |
| 6,733,096 B2 * | 5/2004 | Bae | 312/324 |
| 6,736,438 B1 * | 5/2004 | Wieclawski | 296/24.3 |
| 6,761,278 B2 * | 7/2004 | Hyp et al. | 220/254.2 |
| 6,761,388 B2 * | 7/2004 | Lein et al. | 296/24.34 |
| 6,866,319 B2 * | 3/2005 | Hupfer | 296/37.8 |
| 6,929,304 B1 * | 8/2005 | Dry et al. | 296/37.8 |
| 7,011,273 B1 | 3/2006 | Stanford | |
| 7,147,259 B2 * | 12/2006 | Radu et al. | 296/24.34 |
| 7,192,070 B2 * | 3/2007 | Radu et al. | 296/24.34 |
| 7,431,365 B2 * | 10/2008 | Sturt et al. | 296/24.34 |
| 7,520,552 B2 * | 4/2009 | Nakamura et al. | 296/24.34 |
| 2001/0030436 A1 | 10/2001 | Kifer et al. | |
| 2002/0163215 A1 | 11/2002 | Emerling et al. | |
| 2006/0108816 A1 | 5/2006 | Radu et al. | |

FOREIGN PATENT DOCUMENTS

| | | | |
|---|---|---|---|
| JP | 62037249 A | * | 2/1987 |
| JP | 03007636 A | * | 1/1991 |
| JP | 05338496 A | * | 12/1993 |
| JP | 06092186 A | * | 4/1994 |
| WO | WO 00/21793 | | 4/2000 |
| WO | WO 02/087987 | | 11/2002 |

* cited by examiner

VEHICLE CONSOLE ASSEMBLY

BACKGROUND

The present disclosure generally relates to a console assembly disposed laterally between side-by-side passenger seats in a vehicle, and more particularly to a multi-compartment console and armrest assembly for a vehicle.

Many vehicles include a center console assembly located between the driver and passenger seats for use as an armrest and for storage and placement of various articles. Often, the console assembly includes an armrest cover hinged to a base. The base usually defines a storage compartment adapted for receiving various articles therein. More particularly, the storage compartment typically has an open end that is selectively closed by the armrest cover. There is always a need for improved console assemblies that facilitate storage of articles within a vehicle.

BRIEF DESCRIPTION

According to one aspect, a console and armrest assembly is provided for a vehicle. More particularly, in accordance with this aspect, the console and armrest assembly includes a console base defining a first storage area and a first storage area opening for providing access to the first storage area. A first intermediate member is configured to selectively close the first storage area opening. The first intermediate member defines a second storage area and a second storage area opening for providing access to the second storage access, A second intermediate member is configured to selectively close the second storage area opening. The second intermediate member defines a third storage area and a third storage area opening for providing access to the third storage area. An armrest cover is configured to selectively close the third storage area opening.

According to another aspect, a multi-compartment console assembly is provided for a vehicle. More particularly, in accordance with this aspect, the multi-compartment console assembly includes a base defining a first storage compartment with a first storage compartment open end. A first intermediate member is pivotally disposed on the base closing the first storage compartment open end. The first intermediate member is pivotable to an open position for providing access through the first storage compartment open end to the first storage compartment. The first intermediate member defines a second storage compartment with a second storage compartment open end. A second intermediate member is pivotally disposed on the first intermediate member closing the second storage compartment open end. The second intermediate member is pivotable to an open position for providing access through the second storage compartment open end to the second storage compartment. The second intermediate member defines a third storage compartment with a third storage compartment open end. A cover is pivotally disposed on the second intermediate member closing the third storage compartment open end. The cover is pivotal to an open position for providing access through the third storage compartment open end to the third storage compartment.

According to yet another aspect, a console assembly disposed laterally between side-by-side passenger seats in a vehicle is provided. More particularly, in accordance with this aspect, the console assembly includes a base having a base bottom wall, a base forward wall extending upward from the base bottom wall, a rearward wall extending upward from the base bottom wall, and two spaced apart base side walls extending upward from the base bottom wall and extending longitudinally between the base forward and rearward walls. A first storage compartment is defined by the base bottom wall, the base forward wall, the base rearward wall, and the spaced apart base side walls. The first storage compartment has a first storage compartment open upper end.

A first intermediate member is pivotally connected to the base and moveable between a closed position and an open position. The first intermediate member has a first intermediate member bottom wall that closes the upper end of the first storage compartment when the first intermediate member is in the closed position. The first intermediate member forward wall extends upward from the first intermediate member bottom wall. A first intermediate rearward wall extends upward from the first intermediate member bottom wall and two spaced apart intermediate member side walls extend upward from the first intermediate bottom wall and extend longitudinally between the first intermediate member forward and rearward walls. A second storage compartment is defined by the first intermediate bottom wall, the first intermediate member forward wall, the first intermediate member rearward wall and the spaced apart intermediate member side walls. The second storage compartment has a second storage compartment open upper end.

A second intermediate member is pivotally connected to the first intermediate member and movable between a closed position and an open position. The first intermediate member has a second intermediate member bottom wall that closes the open upper end of the second storage compartment when the second intermediate member is in the closed position. A second intermediate member forward wall extends upward from the second intermediate member bottom wall. A second intermediate rearward wall extends upward from the second intermediate member bottom wall and two spaced apart second intermediate side walls extend upward from the second intermediate member bottom wall and extend longitudinally between the second intermediate member forward and rearward walls. A third storage compartment is defined by the second intermediate member bottom wall the second intermediate member forward wall, the second intermediate rear wall, and the spaced apart second intermediate member side walls. The third storage compartment has a third storage compartment open upper end. A cover is pivotally connected to the second intermediate member and movable between a closed position and an open position. The cover closes the open upper end of the third storage compartment when the cover is in the closed position.

DETAILED DESCRIPTION

Figure 1:
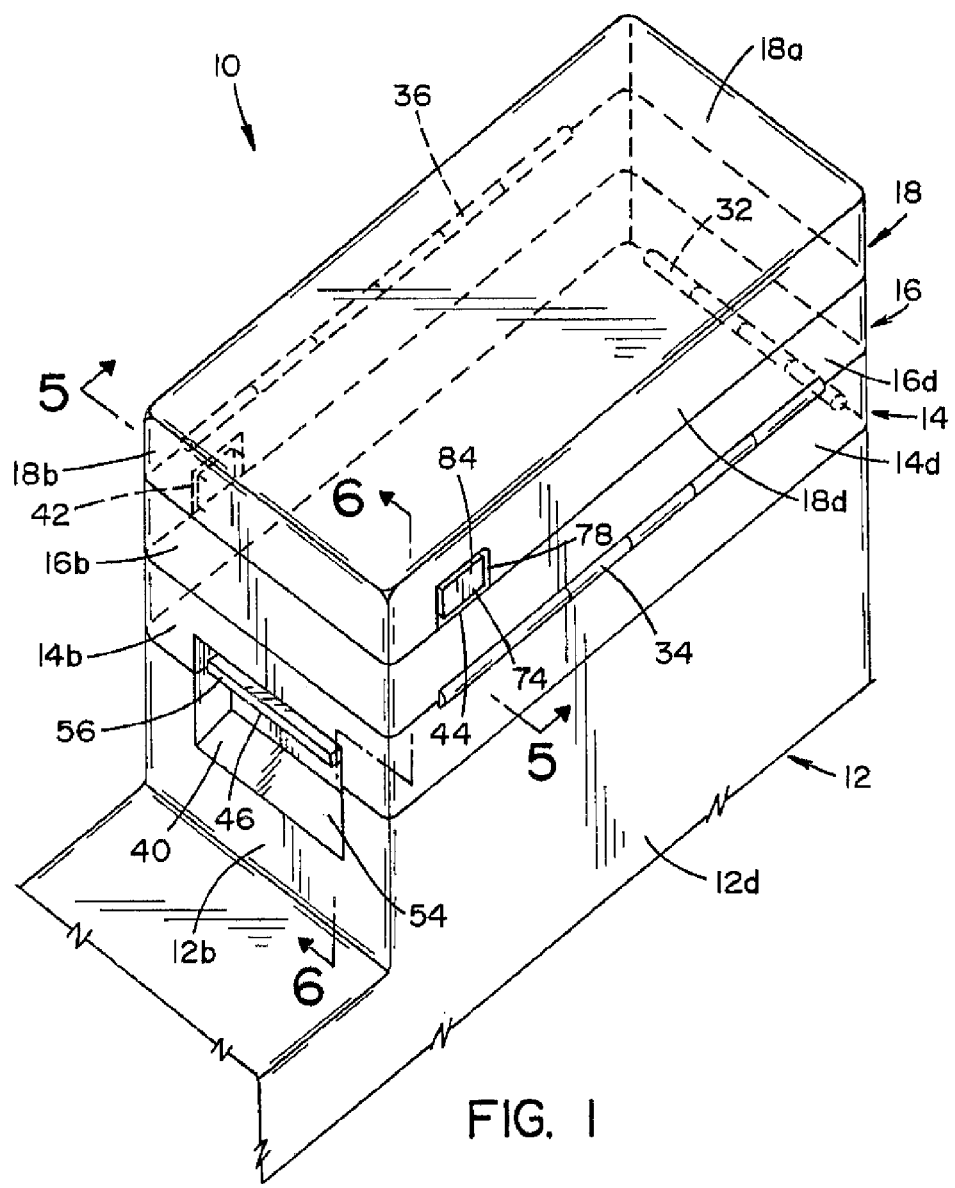
FIG. 1 is a perspective view of a multi-compartment console assembly for a vehicle.

Referring now to the drawings, wherein the showings are for purposes of illustrating one or more exemplary embodiments, FIG. 1 shows a multi-compartment console and armrest assembly 10 for a vehicle. Though not illustrated, the console assembly 10 can be disposed laterally between side-by-side passenger seats in the vehicle, such as the driver's seat and the front passenger's seat. The console assembly 10 includes a console base 12 and a first or lower intermediate member 14 stacked thereon. The console assembly 10 additionally includes a second or upper intermediate member 16 stacked on the lower intermediate member 14 and an armrest cover 18 stacked on the upper intermediate member 16.

With additional reference to FIG. 5, the console base 12 defines a first storage area 20, alternatively referred to herein as a console base storage area or first storage compartment, and further defines a first storage area opening 22 for providing access to the first storage area 20 as will be described in more detail below. The lower intermediate member 14 is configured to selectively close the first storage area opening 22. The lower intermediate member 14 defines a second storage area 24, also referred to herein as the lower intermediate member storage area or second storage compartment, and further defines a second storage area opening 26 for providing access to the second storage area 24. The upper intermediate member 16 defines a third storage area 28, alternatively referred to herein as the upper intermediate member storage area or third storage compartment, and further defines a third storage area opening 30 for providing access to the third storage area 28. As will also be described in more detail below, the upper intermediate member 16 is configured to selectively close the second storage area opening 26 and the armrest cover 18 is configured to selectively close the third storage area opening 30. As shown in the illustrated embodiment, the compartments 20, 24, 28 are each generally rectangular shaped and stacked on top of one another, and can be entirely separate from one another.

Figure 3:
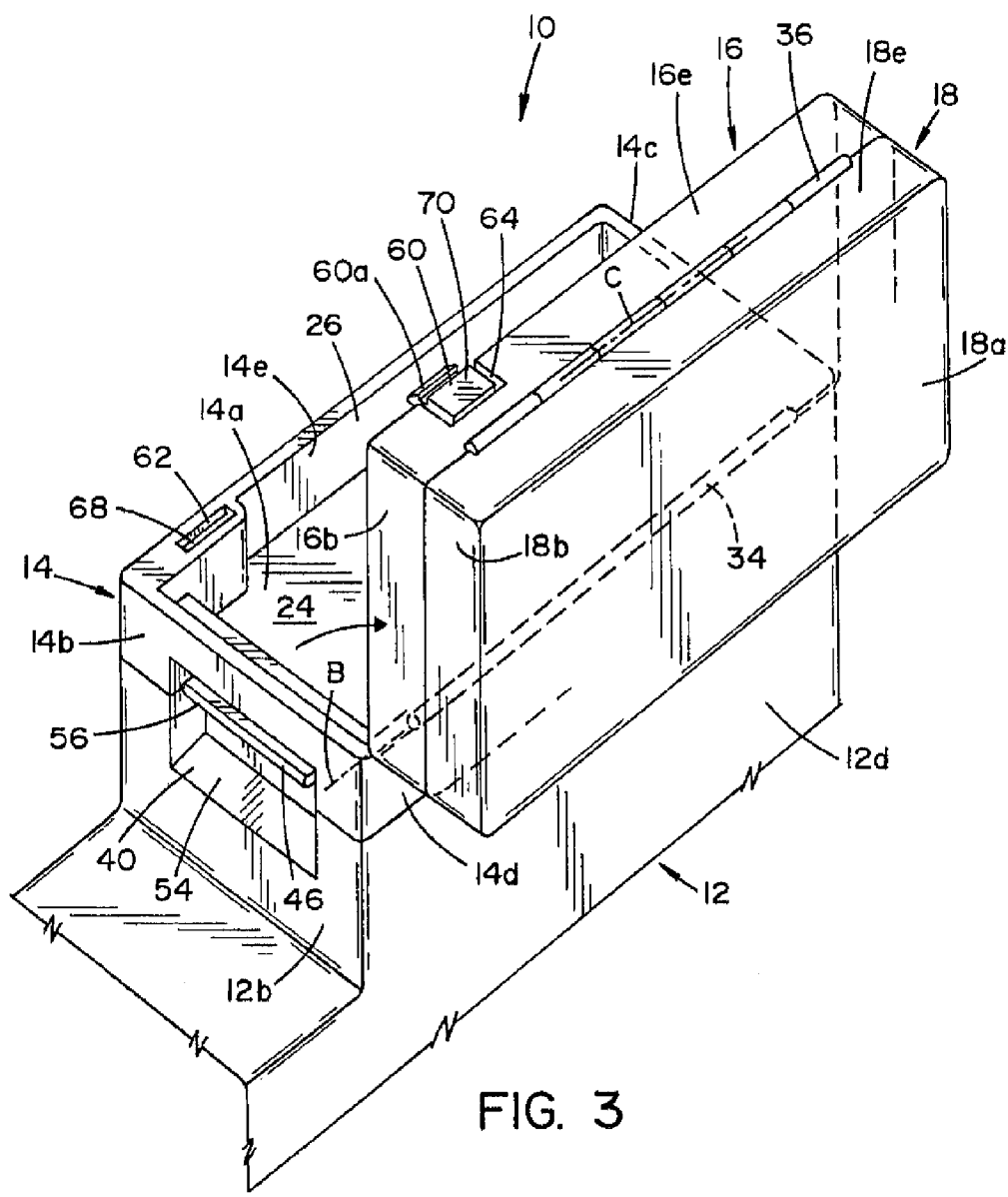
FIG. 3 is a perspective view of the console assembly of FIG. 1 shown with an upper intermediate member thereof moved to an open position to provide access to a storage area defined in a lower intermediate member.
Figure 4:
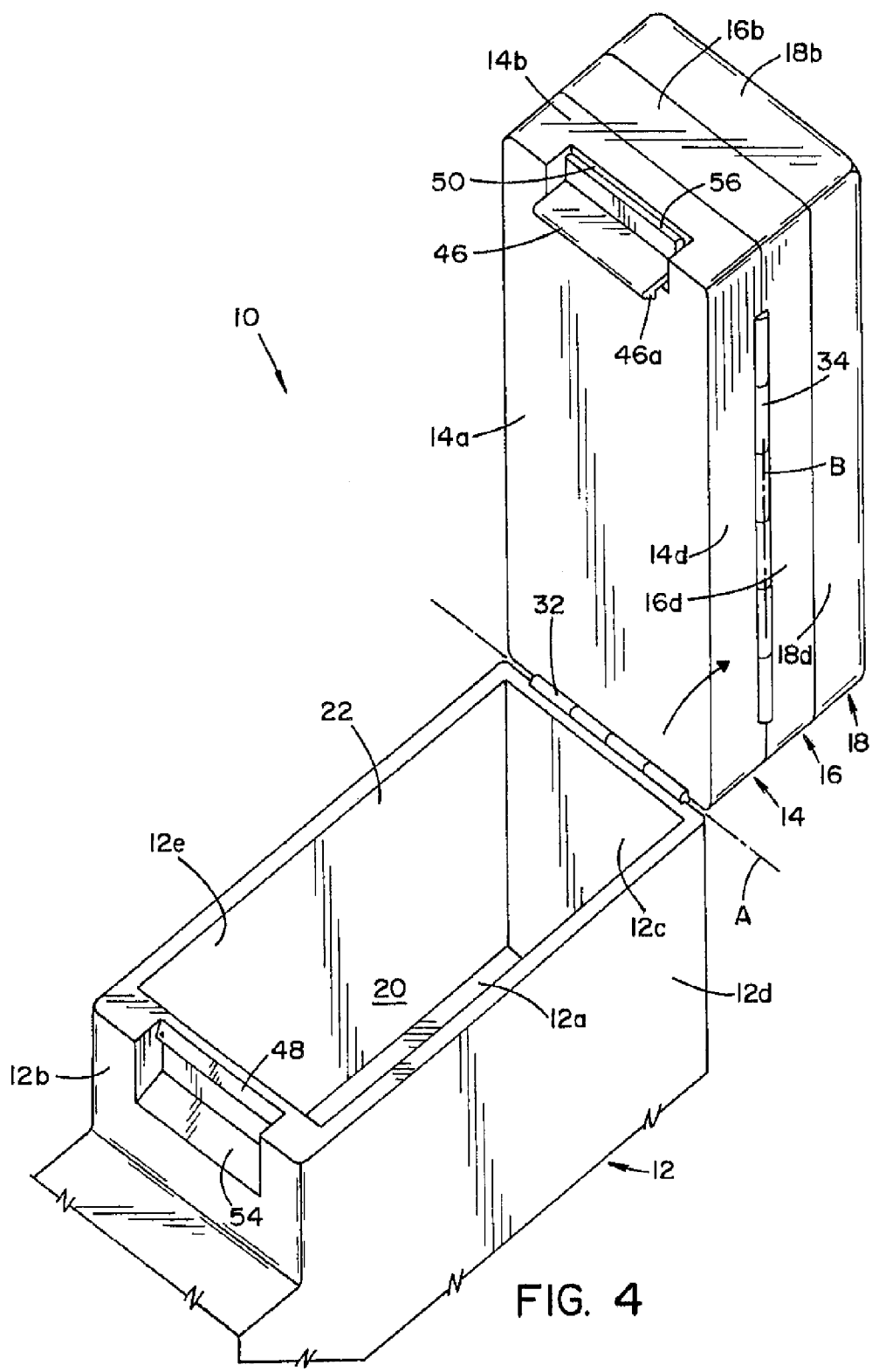
FIG. 4 is a perspective view of the console assembly of FIG. 1 shown with the lower intermediate member moved to an open position to provide access to a storage area defined in a base of the console assembly.

More particularly, and with further reference to FIG. 4, the lower intermediate member 14 is pivotally disposed on the console base 12 for selectively closing the first storage area opening 22, also referred to herein as a first storage compartment open upper end. The lower intermediate member 14 is pivotable to an open position (the position shown in FIG. 4) for providing access through the first storage area opening 22 to the first storage compartment 20. With additional reference to FIG. 3, the upper intermediate member 16 is pivotally disposed on the lower intermediate member 14 for selectively closing the second storage area opening 26, alternately referred to herein as the second storage compartment open upper end. The upper intermediate member 16 is pivotable to an open position (the position shown in FIG. 3) for providing access through the second storage area opening 26 to the second storage compartment 24. With still further reference to FIG. 2, the cover 18 is pivotally disposed on the upper intermediate member 16 for selectively closing the third storage area opening 30, alternately referred to herein as the third storage compartment open upper end. The cover 18 is pivotable to an open position (the position shown in FIG. 2) for providing access through the third storage area opening 30 to the third storage compartment 28.

More specifically, the lower intermediate member 14 is pivotally connected to the console base 12 by hinge 32 disposed along a lateral side of the console assembly (see FIG. 4). The upper intermediate member 16 is pivotally connected to the lower intermediate member 14 by a hinge 34 disposed along a longitudinal side of the console assembly 10 (see FIG. 3). The armrest cover 18 is pivotally connected to the upper intermediate member 16 by a hinge 36 disposed along a longitudinal side of a console assembly 10 (see FIG. 2). The hinges 32, 34, 36 can be any known hinge connection suitable for connecting components of a console assembly in hinged relation. Additionally, it is to be understood that the terms lateral and longitudinal are used herein with respect to the orientation of the console assembly in a vehicle. Thus, lateral refers to a direction extending generally across the vehicle and longitudinal refers to a direction extending generally along a length of the vehicle.

Figure 5:
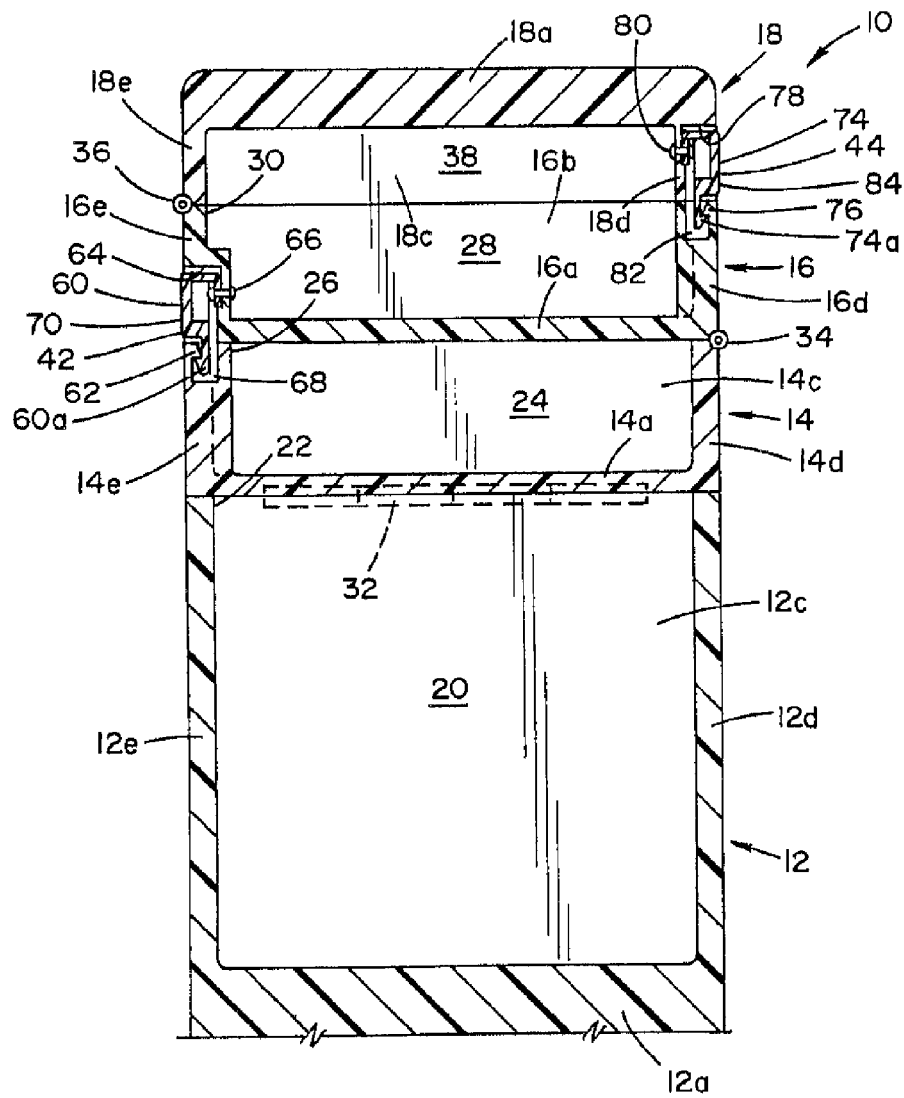
FIG. 5 is a cross-sectional view taken along the line 5-5 of FIG. 1.

With particular reference to FIGS. 4 and 5, the base console 12 has a base bottom wall 12a, a base forward wall 12b extending upward from the base bottom wall 12a, a base rearward wall 12c extending upward from the base bottom wall 12a, and two spaced apart base side walls 12d, 12e extending upward from the base bottom wall 12a and extending longitudinally between the base forward and rearward walls 12b, 12c. The first storage compartment 20 is specifically defined by the base bottom wall 12a, the base forward wall 12b, the base rearward wall 12c, and the spaced apart base side walls 12d, 12e. Similarly, with reference to FIGS. 3 and 5, the lower intermediate member 14 has a lower intermediate member bottom wall 14a, a lower intermediate member forward wall 14b extending upward from the bottom wall 14a, a lower intermediate rearward wall 14c extending upward from the bottom wall 14a, and two spaced apart lower intermediate member side walls 14d, 14e extending upward from the bottom wall 14a and extending longitudinally between the forward and rearward walls 14b, 14c. As shown, the bottom wall 14a is the particular wall that closes the open upper end 22 of the first storage compartment 20 when the lower intermediate member 14 is in its closed position (FIGS. 1 and 5). As also shown, the second storage compartment 24 is particularly defined by the bottom wall 14a, the forward wall 14b, the rearward wall 14c, and the spaced apart side walls 14d, 14e.

Figure 2:
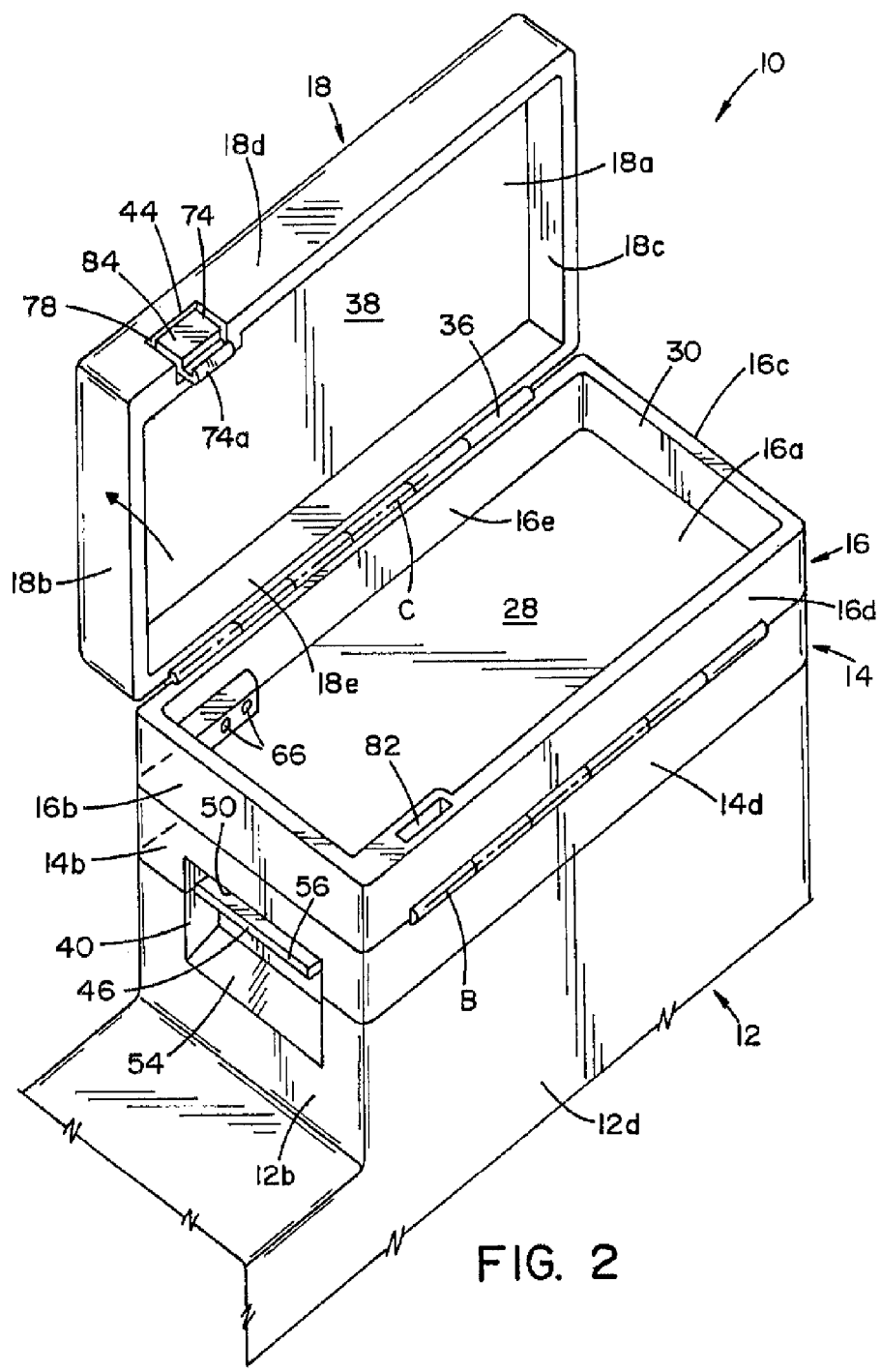
FIG. 2 is a perspective view of the console assembly of FIG. 1 shown with an armrest cover thereof moved to an open position which provides access to a storage area defined in an upper intermediate member.

With reference to FIGS. 2 and 5, the upper intermediate member 16 includes an upper intermediate member bottom wall 16a, an upper intermediate member forward wall 16b that extends upward from the bottom wall 16a, an upper intermediate member rearward wall 16c extending upward from the bottom wall 16a, and two spaced apart upper intermediate member side walls 16d, 16e extending upward from the bottom wall 16a and extending longitudinally between the forward and rearward walls 16b, 16c. The bottom wall 16a is the particular wall that closes the second storage area opening 26 of the second storage compartment 24 when the upper intermediate member 16 is in its closed position (FIGS. 1 and 5). The third storage compartment 28 is at least partially defined by the bottom wall 16a, the forward wall 16b, the rearward wall 16c, and the spaced apart side walls 16d, 16e.

In the illustrated embodiment, the cover 18 closes the third storage area opening 30 of the third storage compartment 28, both defined by the upper intermediate member 16. More particularly, in the illustrated embodiment, the cover 18 includes a cover upper wall 18a, a cover forward wall 18b depending downward from the upper wall 18a, a cover rearward wall 18c depending downward from the upper wall 18a, and two spaced apart cover side walls 18d, 18e depending downward from the upper wall 18a and extending longitudinally between the forward and rearward wall 18b, 18c. The walls 18a-e and thus the cover 18, define an auxiliary storage area 38 that is stacked or provided above the third storage area 28 when the cover 18 is in its closed position. In the depicted configuration, the third storage area 28 can be considered to include the auxiliary storage area 38 of the cover 18 and thus the longitudinal sides 18d, 18e of the cover and the lateral sides of the cover 18b, 18c define coextensive sides of the storage area 28.

As already mentioned, the lower intermediate member 14 is pivotally connected to the console base 12 along a lateral side thereof. In the illustrated embodiment, the lateral side at which the lower intermediate member 14 is pivotally connected to the base 12 is the rear side or rearward wall 12c of the base 12. As also already mentioned, the upper intermediate member 16 is pivotally connected to the lower intermediate member 14 along the longitudinal side thereof. In the illustrated embodiment, the upper intermediate member 16 is pivotally connected to the lower intermediate member 14 along one of the lower intermediate member side walls 14d, 14e. The particular longitudinal side could be the driver's side if the vehicle in which the console assembly 10 is received has a driver's side position to the right of the console assembly 10 as shown per the orientation of FIG. 5. More specifically, in the illustrated embodiment, the upper intermediate member 16 is pivotally connected to the lower intermediate member wall 14d (the rightmost side wall of the lower intermediate member in FIG. 5).

As also already mentioned, the cover 18 is pivotally connected to the upper intermediate member 16 along a longitudinal side thereof (e.g., along one of the upper intermediate member side walls 16d, 16e). As shown, the side wall 16d or 16e to which the cover 18 is attached can be laterally opposite the side wall 14d or 14e to which the upper intermediate member 16 is pivotally connected. More particularly, in the illustrated embodiment, the cover 18 is attached to the side wall 16e that is laterally opposite the side wall 14d to which the upper intermediate member 16 is pivotally connected. Should the driver's side be the right side of the console assembly 10 in FIG. 5, the left side of the console assembly 10 would then be the passenger's side per the orientation of FIG. 5. Of course, the driver's side could be to the left of the console assembly 10 with the passenger's side being to the right of the console assembly 10 in FIG. 5 in certain vehicles (e.g., right hand drive vehicles).

The console assembly 10 additionally includes a plurality of latching mechanisms 40, 42, 44 that selectively lock the lower intermediate member 14, the upper intermediate member 16 and the cover 18 in respective closed positions. More particularly, first latching mechanism 40 selectively locks the lower intermediate member in its closed position on the base console 12 wherein the lower intermediate member 14 closes the first storage opening 22. Second latching mechanism 42 selectively locks the upper intermediate member 16 in its closed position on the lower intermediate member 14 wherein the upper intermediate member 16 closes the second storage opening 26. Third latching mechanism 44 selectively locks the cover 18 in its closed position on the upper intermediate member 16 wherein the cover 18 closes the third storage area opening 30.

Figure 6:
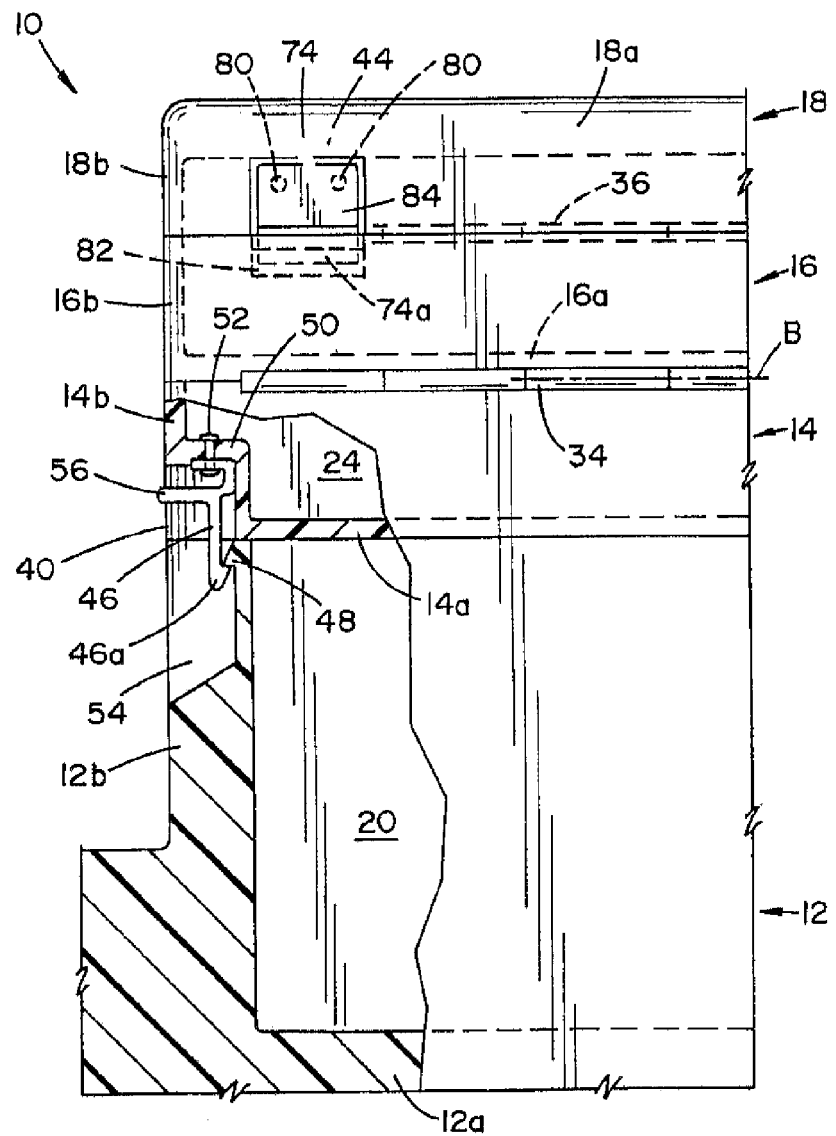
FIG. 6 is a partial cross-sectional view taken along the line 6-6 of FIG. 1

With reference to FIG. 6, the first latching mechanism 40 of the illustrated embodiment includes a latch 46 having a latching portion 46a cooperatively engaged with a catch 48. As shown, the latch 46 can be secured to the forward wall 14b of the lower intermediate member 14, and particularly to an undercut portion 50 of the forward wall 14b by any known means, such as by one or more fasteners (e.g., the illustrated rivet fastener 52). The illustrated latch 46 depends downwardly from the undercut portion 50 into a recess 54 formed in the forward wall 12b. The latch 46 includes a latch actuator 56 that, when depressed, causes the latching portion 46a to release from the catch 48. Thus, depression of the latch actuator 56 releases the latch 46 and unlocks the lower intermediate member 14 from the base 12 so that the lower intermediate member is movable from its closed position (shown in FIG. 6) to its open position (shown in FIG. 4). The latching mechanism 40 selectively locks the lower intermediate member 14 to the base 12. The first storage area 20 defined in the base 12 is accessible by depressing the latch 46, particularly the latch actuator 56 of the latch 46, and rotating the lower intermediate member 14 from its closed position toward its open, aft position with the upper intermediate member 16 and the cover 18 stacked thereon.

With reference to FIG. 5 in the illustrated embodiment, the second latch mechanism 42 includes a latch 60 having a latching portion 60a cooperatively engaged with a catch 62 to lock the upper intermediate member 16 in its closed position on the lower intermediate member 14. As shown, the latch 60 can be secured to a recessed portion 64 of the side wall 16e by any known means, such as one or more suitable fasteners (e.g., rivet fasteners 66). The catch 62 can be formed integrally with the side wall 14e of the lower intermediate member 14 and the latching portion 60a can be received within a recess 68 defined in the wall 14e adjacent the catch 62. The latch 60 can include a latch actuator or actuator portion 70 which, upon depression thereof, releases the latch 60, and particularly the latch portion 60a, from the catch 62 and unlocks the upper intermediate member 16 from the lower intermediate member 14 so that the upper intermediate member 16 is movable to its open position. With the latch 60 released, the upper intermediate member 16 is pivotable with the cover 18 stacked thereon and thus the second storage area 24 is accessible by depressing of the latch 60 and rotating the upper intermediate member from its closed position toward an open position (to the right end FIG. 5, which can be a driver's side of the vehicle in which the console assembly 10 is disposed).

With continued reference to FIG. 5, the third latching mechanism 44 in the illustrated embodiment includes a latch 74 having a latching portion 74a cooperatively engaged with a catch 76 to lock the cover 18 to the upper intermediate member 16 in the cover's closed position. As shown, the latch 74 can be secured to the side wall 18d of the cover 18, and particularly to a recessed portion 78 of the side wall 18d. The latch 74 can be secured to the recessed portion 78 by any known means, such as a suitable fastener or fasteners (e.g., rivet fasteners 80). The catch 76 can be integrally formed with the side wall 16d with the upper intermediate members 16. A recess 82 can be formed adjacent the catch 76 for receiving the latching portion 74a. A latch actuator 84, upon depression, releases the latch 74 and unlocks the cover 18 from the upper intermediate member 16 so that the cover 18 is movable to its open position. Thus, the third storage area 28 is accessible by depressing the latch 74 and rotating the cover 18 from its closed position to its open position (to the left side in FIG. 5, which can be a passenger side position when the left side is the passenger side seating area).

In operation, the illustrated console assembly 10 provides three storage compartments (i.e., first, second, and third storage compartments 20, 24, 28, which are generally rectangular shaped and stacked on top of one another, as well as separate from one another). The lower intermediate member 14 is movable about a first laterally extending axis A between its closed position wherein the lower intermediate cover 14 closes the first storage area opening 22 and its open position wherein the first storage area 20 is accessible through the first storage area opening 22. With reference to FIG. 4, the first laterally extending axis A of the illustrated embodiment is disposed adjacent a rear side of the console assembly 10. With reference to FIG. 3, the upper intermediate member 16 is movable about a second longitudinally extending axis B between its closed position wherein the upper intermediate member 16 closes the second storage area opening 26 and its open position wherein the second storage area 24 is accessible through the second storage area opening 26.

With reference to FIG. 2, the cover 18 is movable about a third longitudinal extending axis C between its closed position wherein the cover 18 closes the third storage area opening 30 and its open position wherein the third storage area 28 is accessible through the third storage area opening 30. When the illustrated console assembly 10 is employed in a vehicle having a driver's side or seat disposed on the right side of the assembly per the orientation of FIG. 5 and a passenger's seating area or side disposed on the left side of the console assembly 10 per the orientation of FIG. 5 (as a typical vehicle is configured in the U.S.), the second longitudinally extending axis B is positioned adjacent the driver's side of the vehicle and the third longitudinally extending axis C is positioned adjacent the passenger's side of the vehicle spaced apart from the second longitudinally extending axis B. Of course, should the illustrated console assembly 10 be disposed in a vehicle with the driver and passenger sides disposed in a reverse configuration (such as a typical Japanese vehicle arrangement), the second longitudinally extending axis B would be positioned adjacent the passenger's side of the vehicle and the third longitudinally extending axis C would be positioned adjacent the driver's side of the vehicle. Further, it is contemplated that the hinge connections 32, 34, 36 could be positioned other than as shown in the illustrated embodiment. For example, the lateral hinge 32 could be positioned along a forward side of the console assembly 10, the hinges 34 and 36 could be on reverse sides, the hinges 34 and 36 could be positioned on the same side of the console assembly 10, etc.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A console and armrest assembly for a vehicle, comprising:
   a console base defining a first storage area and a first storage area opening for providing access to said first storage area;
   a first intermediate member pivotally connected to said base and configured to selectively close said first storage area opening, said first intermediate member defining a second storage area and a second storage area opening for providing access to said second storage area;
   a second intermediate member pivotally connected to said first intermediate member and configured to selectively close said second storage area opening, said second intermediate member defining a third storage area and a third storage area opening for providing access to said third storage area;
   an armrest cover configured to selectively close said third storage area opening;
   a first latching mechanism for selectively locking said first intermediate member in a closed position on said console base wherein said first intermediate member closes said first storage area opening;
   a second latching mechanism for selectively locking said second intermediate member in a closed position on said first intermediate member wherein said second intermediate member closes said second storage area opening, said second mechanism being secured to a longitudinally extending side wall of the second intermediate member; and
   a third latch mechanism for selectively locking said armrest cover in a closed position on said second intermediate member wherein said armrest cover closes said third storage area opening, said third latching mechanism being secured to a longitudinally extending side wall of the armrest cover and being disposed on an opposite side of the console and armrest assembly as said second latching mechanism.

2. The console and armrest assembly of claim 1 wherein said first, second and third storage compartments are separate from one another.

3. The console and armrest assembly of claim 1 wherein said armrest cover includes longitudinal sides that partially define longitudinal sides of said third storage compartment.

4. The console and armrest assembly of claim 1 wherein said first storage area is accessible by depressing a latch of said first latching mechanism and rotating said first intermediate member from a closed position toward an aft position, said second storage area is accessible by depressing a latch of said second latching mechanism and rotating said second intermediate member from a closed position toward a driver side position, and said third storage area is accessible by depressing a latch of said third latching mechanism and rotating said armrest cover from a closed position toward a passenger side position.

5. The console and armrest assembly of claim 1 wherein said first intermediate member is movable about a first laterally extending axis between a closed position wherein said first intermediate member closes said first storage area opening and an open position wherein said first storage area is accessible through said first storage area opening, said second intermediate member is movable about a second longitudinally extending axis between a closed position wherein said second intermediate member closes said second storage area opening and an open position wherein said second storage area is accessible through said second storage area opening, and said armrest cover is movable about a third longitudinally extending axis between a closed position wherein said armrest cover closes said third storage area opening and an open position wherein said third storage area is accessible through said third storage area opening.

6. The console and armrest assembly of claim 5 wherein said second longitudinally extending axis is positioned adjacent a driver side of the vehicle and said third longitudinally extending axis is positioned adjacent a passenger side of the vehicle spaced apart from said second longitudinally extending axis.

7. The console and armrest assembly of claim 1 wherein said first intermediate member is pivotally connected to said console base along a lateral side thereof.

8. The console and armrest assembly of claim 7 wherein said second intermediate member is pivotally connected to said first intermediate member along a longitudinal side thereof.

9. The console and armrest assembly of claim 8 wherein said armrest cover is pivotally connected to said second intermediate member along a longitudinal side thereof.

10. The console and armrest assembly of claim 9 wherein said lateral side is a rear side of said console base.

11. The console and armrest assembly of claim 10 wherein said longitudinal side along which said second intermediate member is pivotally connected to said first intermediate member is a driver side of said first intermediate member.

12. The console and armrest assembly of claim 11 wherein said longitudinal side along which said armrest cover is pivotally connected to said second intermediate member is a passenger side of said second intermediate member.

13. A multi-compartment console assembly for a vehicle, comprising:
   a base defining a first storage compartment with a first storage compartment open end;
   a first intermediate member pivotally disposed on said base closing said first storage compartment open end, said first intermediate member pivotable to an open position for providing access through said first storage compartment open end to said first storage compartment, said first intermediate member defining a second storage compartment with a second storage compartment open end;
   a second intermediate member pivotally disposed on said first intermediate member closing said second storage compartment open end, said second intermediate member pivotable to an open position for providing access through said second storage compartment open end to said second storage compartment, said second intermediate member defining a third storage compartment with a third storage compartment open end; and
   a cover pivotally disposed on said second intermediate member closing said third storage compartment open end, said cover pivotable to an open position for providing access through said third storage compartment open end to said third storage compartment.

14. The multi-compartment console assembly of claim 13 wherein said first, second and third storage compartments are generally rectangular shaped and stacked on top of one another.

15. The multi-compartment console assembly of claim 13 wherein said first intermediate member is pivotable with said second intermediate member and said cover stacked thereon about a laterally extending axis disposed adjacent a rear side of the console assembly, said second intermediate member is pivotable with said cover stacked thereon about a longitudinally extending axis disposed adjacent a driver side of the console assembly, and said cover is pivotable about a longitudinally extending axis disposed adjacent a passenger side of the console assembly.

16. The multi-compartment console assembly of claim 15 further including:
   a first latching mechanism locking said first intermediate member to said base to close said first storage compartment closed end;
   a second latching mechanism locking said second intermediate member to said first intermediate member to close said second storage compartment open end, said second latching mechanism being secured to a longitudinally extending side wall of the first intermediate member adjacent the passenger side; and
   a third latching mechanism locking said cover to said second intermediate member to close said third storage compartment open end, said third latching mechanism being secured to a longitudinally extending side wall of the second intermediate member adjacent the driver side.

17. A console assembly disposed laterally between a driver seat and a passenger seat in a vehicle, said console assembly comprising:
   a base having a base bottom wall, a base forward wall extending upward from said base bottom wall, a base rearward wall extending upward from said base bottom wall and two spaced apart base side walls extending upward from said base bottom wall and extending longitudinally between said base forward and rearward walls;
   a first storage compartment defined by said base bottom wall, said base forward wall, said base rearward wall and said spaced apart base side walls, said first storage compartment having a first storage compartment open upper end;
   a first intermediate member pivotally connected to said base and movable between a closed position and an open position, said first intermediate member having a first intermediate member bottom wall that closes said open upper end of said first storage compartment when said first intermediate member is in said closed position, a first intermediate member forward wall extending upward from said first intermediate member bottom wall, a first intermediate member rearward wall extending upward from said first intermediate member bottom wall and two spaced apart first intermediate member side walls extending upward from said first intermediate member bottom wall and extending longitudinally between said first intermediate member forward and rearward walls;
   a second storage compartment defined by said first intermediate member bottom wall, said first intermediate member forward wall, said first intermediate member rearward wall and said spaced apart first intermediate member side walls, said second storage compartment having a second storage compartment open upper end;
   a second intermediate member pivotally connected to said first intermediate member and movable between a closed position and an open position, said first intermediate member having a second intermediate member bottom wall that closes said open upper end of said second storage compartment when said second intermediate member is in said closed position, a second intermediate member forward wall extending upward from said second intermediate member bottom wall, a second intermediate member rearward wall extending upward from said second intermediate member bottom wall and two spaced apart second intermediate member side walls extending upward from said second intermediate member bottom wall and extending longitudinally between said second intermediate member forward and rearward walls;
   a third storage compartment defined by said second intermediate member bottom wall, said second intermediate member forward wall, said second intermediate member rearward wall and said spaced apart second intermediate member side walls, said third storage compartment having a third storage compartment open upper end; and
   a cover pivotally connected to said second intermediate member and movable between a closed position and an open position, said cover closes said open upper end of said third storage compartment when said cover is in said closed position,
   wherein said first intermediate member is pivotally connected to said base by a first hinge connection along said base rearward wall, said second intermediate member is pivotally connected to said first intermediate member by a second hinge connection along one of said first intermediate member sidewalls, and said cover is pivotally connected to said second intermediate member by a third hinge connection along one of said second intermediate member sidewalls, said one of said first intermediate member sidewalls being laterally opposite said one of said second intermediate member sidewalls.

18. The console assembly of claim 17, further comprising:

a first latching mechanism selectively locking said first member to said base;

a second latching mechanism selectively locking said second intermediate member to said first intermediate member, said second latching mechanism being disposed on a first intermediate member side wall laterally opposite said second hinge connection; and a third latching mechanism selectively locking said cover to said second intermediate member, said third latching mechanism being disposed on a second intermediate member side wall laterally opposite said third hinge connection.

19. The console assembly of claim 18, wherein said second hinge connection is disposed adjacent a driver side of said console assembly and said third hinge connection is disposed adjacent a passenger side of said console assembly.

20. The console assembly of claim 18, wherein said second hinge connection is disposed adjacent a passenger side of said console assembly and said third hinge connection is disposed adjacent a driver side of said console assembly.

* * * * *